United States Patent
Hefty et al.

(10) Patent No.: US 9,560,117 B2
(45) Date of Patent: Jan. 31, 2017

(54) LOW LATENCY CLUSTER COMPUTING

(75) Inventors: Mark S. Hefty, Aloha, OR (US); Arlin Davis, Yamhill, OR (US); Robert Woodruff, Banks, OR (US); Sayantan Sur, Portland, OR (US); Shiow-wen Cheng, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 543 days.

(21) Appl. No.: 13/994,478

(22) PCT Filed: Dec. 30, 2011

(86) PCT No.: PCT/US2011/068011
§ 371 (c)(1),
(2), (4) Date: Jun. 14, 2013

(87) PCT Pub. No.: WO2013/101142
PCT Pub. Date: Jul. 4, 2013

(65) Prior Publication Data
US 2014/0129635 A1    May 8, 2014

(51) Int. Cl.
*G06F 13/28* (2006.01)
*H04L 29/08* (2006.01)
(Continued)

(52) U.S. Cl.
CPC ............... *H04L 67/10* (2013.01); *G06F 9/06* (2013.01); *G06F 11/1407* (2013.01);
(Continued)

(58) Field of Classification Search
None
See application file for complete search history.

(56) References Cited

U.S. PATENT DOCUMENTS 5,724,581 A * 3/1998 Kozakura ........... G06F 11/1471
                                                707/674
7,124,207 B1 * 10/2006 Lee ........................ G06F 13/24
                                                710/4
(Continued)

FOREIGN PATENT DOCUMENTS

CN    101030154    9/2007
CN    101123521    2/2008

OTHER PUBLICATIONS

Mitchell, Christopher, "Overlapped Checkpointing with Hardware Assist", IEEE Cluster 2009—Interfaces and Abstractions for Scientific Data Storage (IASDS) Workshop, 2009, 11 pages.
(Continued)

*Primary Examiner* — Ilwoo Park
(74) *Attorney, Agent, or Firm* — Trop, Pruner & Hu, P.C.

(57) ABSTRACT

An embodiment includes a low-latency mechanism for performing a checkpoint on a distributed application. More specifically, an embodiment of the invention includes processing a first application on a compute node, which is included in a cluster, to produce first computed data and then storing the first computed data in volatile memory included locally in the compute node; halting the processing of the first application, based on an initiated checkpoint, and storing first state data corresponding to the halted first application in the volatile memory; storing the first state information and the first computed data in non-volatile memory included locally in the compute node; and resuming processing of the halted first application and then continuing the processing the first application to produce second computed data while simultaneously pulling the first state information and the first computed data from the non-volatile memory to an input/output (IO) node.

22 Claims, 8 Drawing Sheets

(51) Int. Cl.
G06F 13/14 (2006.01)
G06F 9/06 (2006.01)
G06F 11/14 (2006.01)

(52) U.S. Cl.
CPC ...... *G06F 11/1438* (2013.01); *G06F 11/1464* (2013.01); *G06F 11/1466* (2013.01); *G06F 11/1471* (2013.01); *G06F 13/14* (2013.01)

(56) References Cited

U.S. PATENT DOCUMENTS

| 7,573,895 | B2 | 8/2009 | King |
| 2006/0152509 | A1* | 7/2006 | Heirich ................. G06F 11/362 345/426 |
| 2007/0234342 | A1 | 10/2007 | Flynn et al. |
| 2010/0122199 | A1 | 5/2010 | Darrington et al. |
| 2010/0122256 | A1 | 5/2010 | Darrington et al. |
| 2011/0173488 | A1* | 7/2011 | Blumrich ............ G06F 11/1438 714/4.1 |

OTHER PUBLICATIONS

International Searching Authority, "Notification of Transmittal of the International Search Report and the Written Opinion of the International Searching Authority," mailed Jun. 22, 2012, in International application No. PCT/2011/068011.

European Patent Office, Supplementary European Search Report mailed Sep. 23, 2015, In European Patent Application No. 11878714.

State Intellectual Property Office of the People's Republic of China, Office Action mailed Sep. 5, 2016, in Chinese Patent Application No. 201180076175.5.

\* cited by examiner

US 9,560,117 B2

LOW LATENCY CLUSTER COMPUTING

BACKGROUND

High Performance Computing (HPC) and cluster computing involve connecting individual computing nodes to create a distributed system capable of solving complex problems. These nodes may be individual desktop computers, servers, processors or similar machines capable of hosting an individual instance of computation. More specifically, these nodes are constructed out of hardware components including, but not limited to, processors, volatile memory (RAM), magnetic storage drives, mainboards, network interface cards, and the like.

Scalable HPC applications require checkpoint capabilities. In distributed shared memory systems, checkpointing is a technique that helps tolerate the errors leading to losing the effect of work of long-running applications. Checkpointing techniques help preserve system consistency in case of failure. As cluster sizes grow, the mean time between failure decreases, which requires applications to create more frequent checkpoints. This drives the need for fast checkpoint capabilities.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

An embodiment of the invention includes a low-latency mechanism for performing a checkpoint on a distributed application. This includes a multi-step checkpoint process that minimizes the latency experienced by an application.

Figure 1:
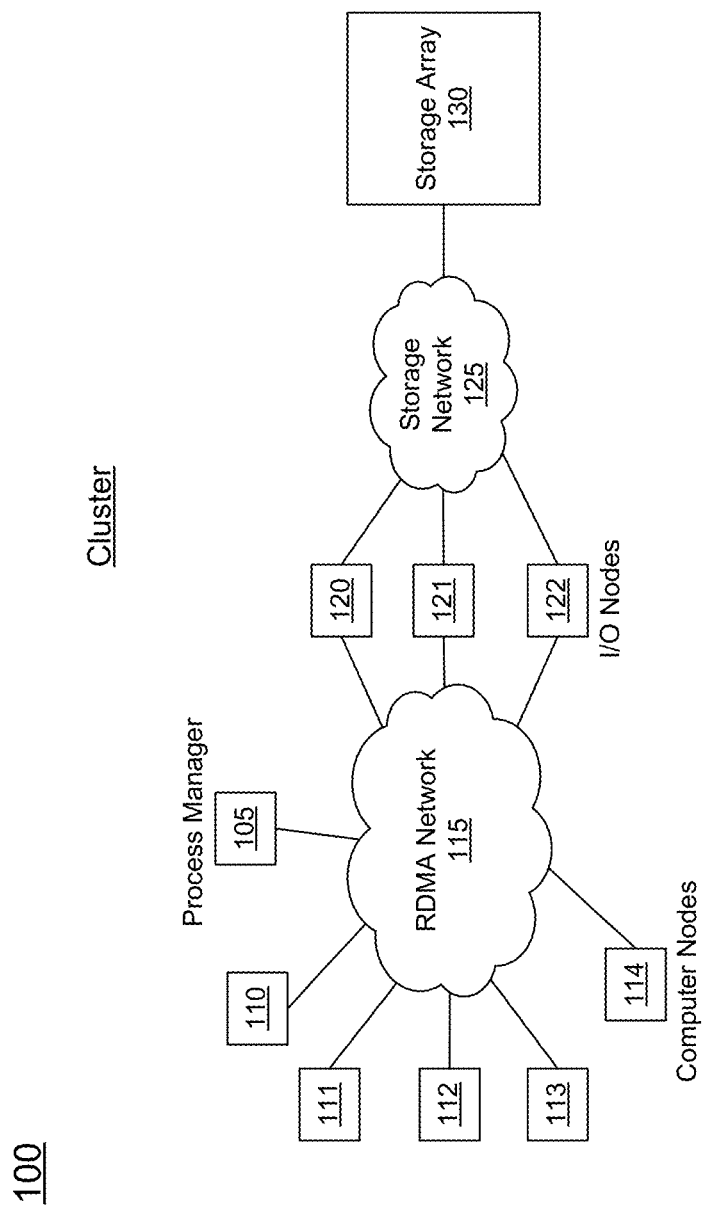
FIG. 1 includes a schematic diagram of a cluster for HPC in an embodiment of the invention.
Figure 2:
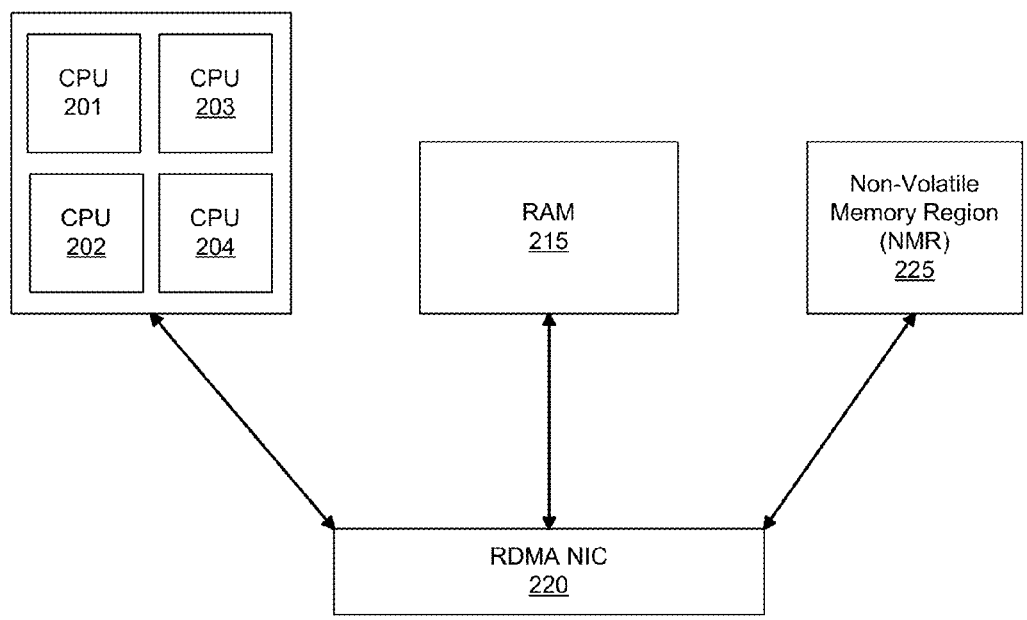
FIG. 2 includes a schematic diagram of a compute node in an embodiment of the invention.

FIGS. 1 and 2 collectively address a cluster including compute nodes as well as a more detailed example of the compute nodes themselves. The following discusses both figures as needed to describe various embodiments of the invention.

FIG. 1 includes a schematic diagram of a cluster for high performance computing in an embodiment. A distributed application is running on multiple compute nodes 110, 111, 112, 113, and 114, which are connected by remote direct memory access (RDMA) capable network 115. Input/output (IO) nodes 120, 121, 122 connect to compute nodes 110, 111, 112, 113, 114 over RDMA network 115 and persistent storage array 130 over storage network 125. Although shown separately, the compute, IO nodes, and networks may share the same hardware.

Process manager 105 controls the overall flow of the application. More specifically, a "process manager" is used to control other nodes in the cluster. For example, process manager 105 may be used to start processes on multiple machines in a cluster remotely, set up the cluster environment and launch processes used in message passing interface (MPI) jobs, provide libraries of commands related to MPI jobs and distributed computing, initiate checkpoints at programmed intervals, and the like. MPI is an application program interface (API) specification that allows computers to communicate with one another. The specification defines the syntax and semantics of a core of library routines useful in cluster computing. In an embodiment, process manager 105 communicates with the compute and IO nodes to start a checkpoint, coordinate the activities of the nodes during the checkpoint, and receives indication that the checkpoint is done.

FIG. 2 includes a schematic diagram of compute node 210 in an embodiment of the invention. For each compute node one or more processors 201, 202, 203, 204 may be used to process one or more application processes, such as processes of a distributed application. Processors 201, 202, 203, 204 may couple to volatile memory (e.g., RAM) 215 via RDMA network interface card (NIC) 220 or other RDMA hardware. Volatile memory 215 may further couple to non-volatile memory region (NMR) (e.g., flash memory, application optimized non-volatile memory, and the like) 225. Thus, various compute nodes provide applications with access to a low-latency NMR. The NMR may be included locally in the compute node (as shown in FIG. 2) or accessible through the RDMA network. RDMA NIC 220 couples compute node 210 and IO nodes to RDMA network 115 and is capable of accessing NMR 225 and/or volatile memory 215 directly.

RDMA supports zero-copy networking by enabling the transfer of data directly to or from application memory, eliminating the need to copy data between application memory (e.g., memory 215) and the data buffers in the operating system. Such transfers require no work to be done by CPUs, caches, or context switches, and transfers continue in parallel with other system operations. When an application performs an RDMA Read or Write request, the application data is delivered directly to the network, reducing latency.

In an embodiment, process manager 105 signals applications included on processors 201, 202, 203, and 204 when a checkpoint is required. After receiving a signal from process manager 105, an application halts external communication and saves the state of all calculations to NMR 225. State data may be written to NMR 225 using bus transfers for local NMR such as NMR 225, or using RDMA NIC 220 for local or remote NMRs. Use of RDMA NIC 220 for local NMR 225 may free host processor (e.g., processor 201) from needing to control bus transfers. Once done, the application processes reply to process manager 105 that they have completed their checkpoint tasks and continue with further calculations. This completes a first phase of a checkpoint process. The CPU (201, 202, 203, and 204) or RDMA may also transfer process data, which is related to the applications being processed on compute node 210, from volatile memory 215 to NMR 225.

A second phase of the checkpoint process begins after the computational states and processed data have been saved to NMR 225. Then IO nodes 120, 121, 122 access NMR 225 across RDMA network 115. State information and process data are read out of the NMR or NMRs 225 and written to storage array 130. Process manager 105 is notified of the final completion of the checkpoint, which allows NMRs (e.g., 225) to be reused.

Although the use of NMR 225 provides for greater fault tolerance recovery, the use of non-volatile memory in the first phase of the checkpoint process may be replaced with volatile memory in order to reduce latency, but at greater costs.

Thus, conventional systems may save computational state to persistent storage. For distributed applications this usually means using a distributed file system to save state information to remotely located hard disk drives. As a result, the application is prevented from continuing calculations until the checkpoint data has been written to persistent storage across a latency inducing network. In contrast, an embodiment of the invention uses a multi-phase checkpoint process and RDMA to reduce the latency (as seen from the perspective of the application) required to perform a checkpoint. This allows checkpoints to occur more often, which is essential for scaling up applications to large cluster sizes (e.g., exascale). By making use of RDMA technologies embodiments avoid competing with applications for processing power while copying the data from the compute nodes to the storage arrays.

Furthermore, conventional systems do not combine the use of fast, secondary memory regions (e.g., NMR 225) with RDMA protocols. Together, these features allow applications to quickly checkpoint data to smaller, affordable memory regions, with background RDMA transfers offloading the data to larger, cheaper storage units. Embodiments of the invention may be utilized in various products, including MPI products involved in clusters and HPC systems.

Figure 3:
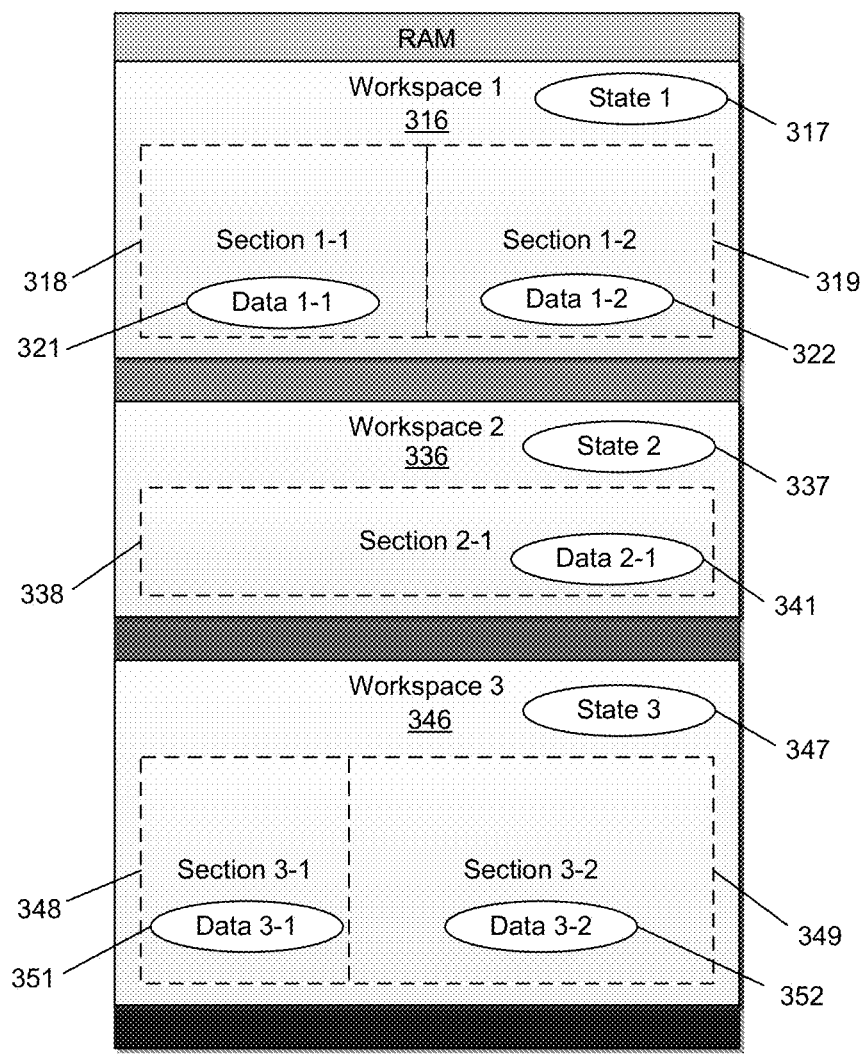
FIG. 3 includes a block diagram of volatile memory of a compute node in an embodiment of the invention.
Figure 4:
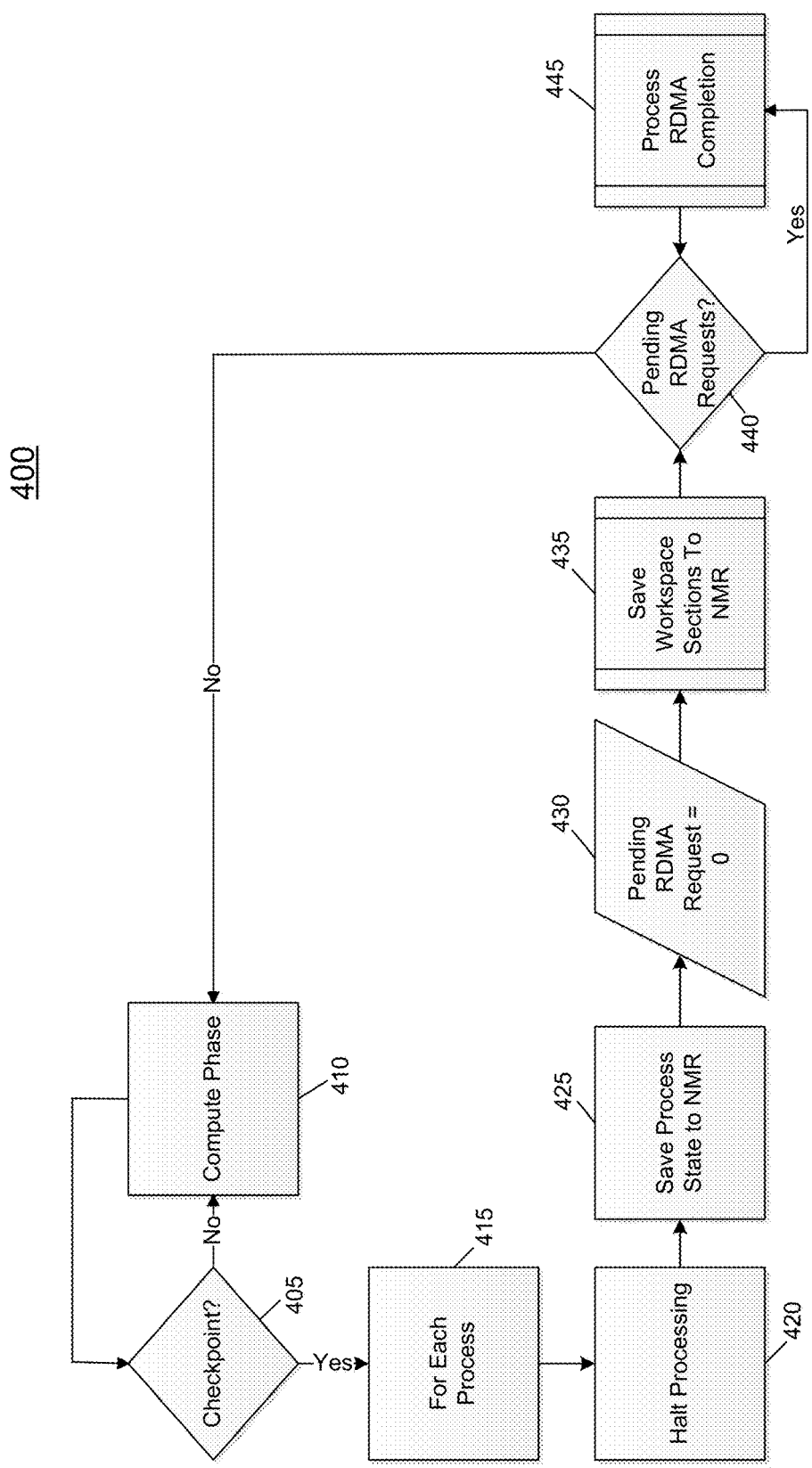
FIGS. 4-5 includes flow diagrams for a first phase of checkpoint processing in embodiments of the invention.
Figure 5:
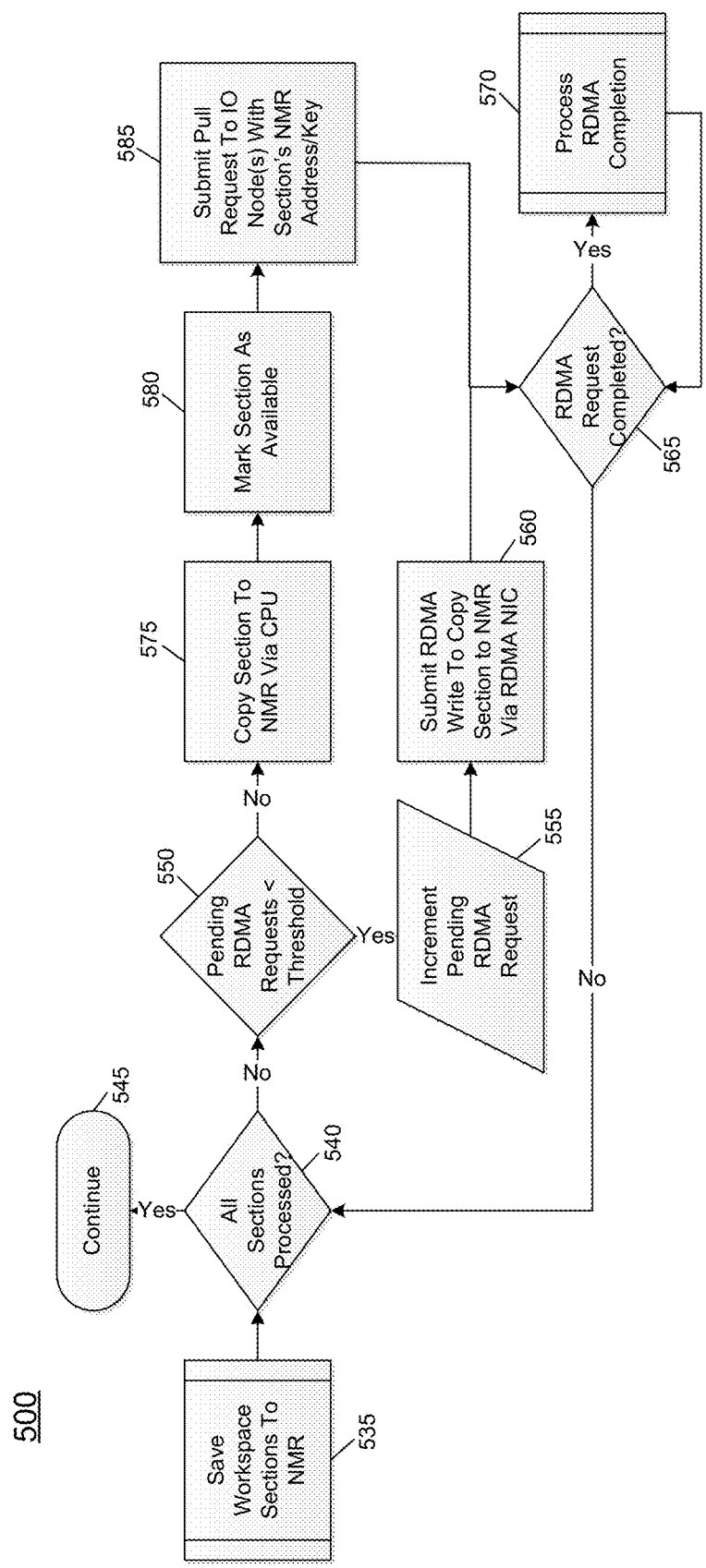
Figure 6:
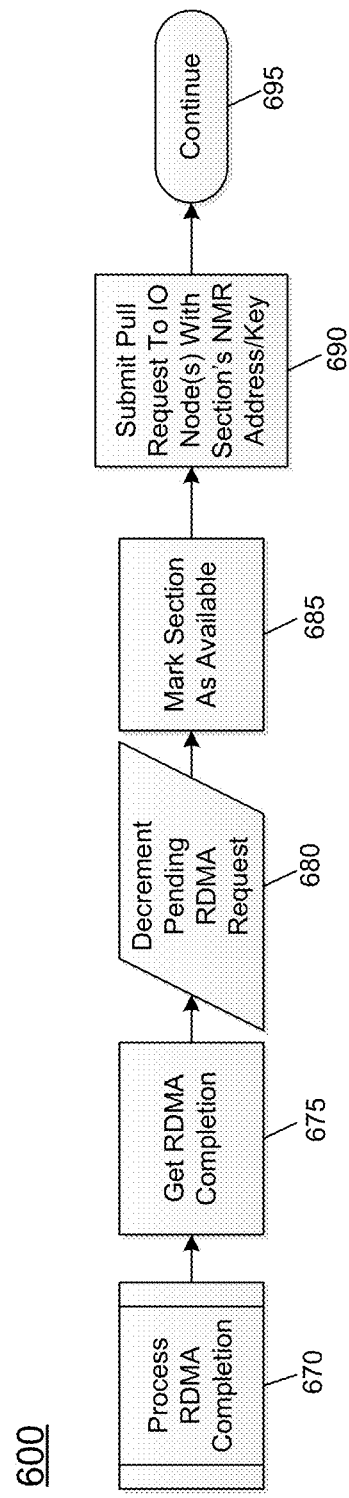
FIGS. 6-7 include flow diagrams for a second phase of checkpoint processing in embodiments of the invention.
Figure 7:
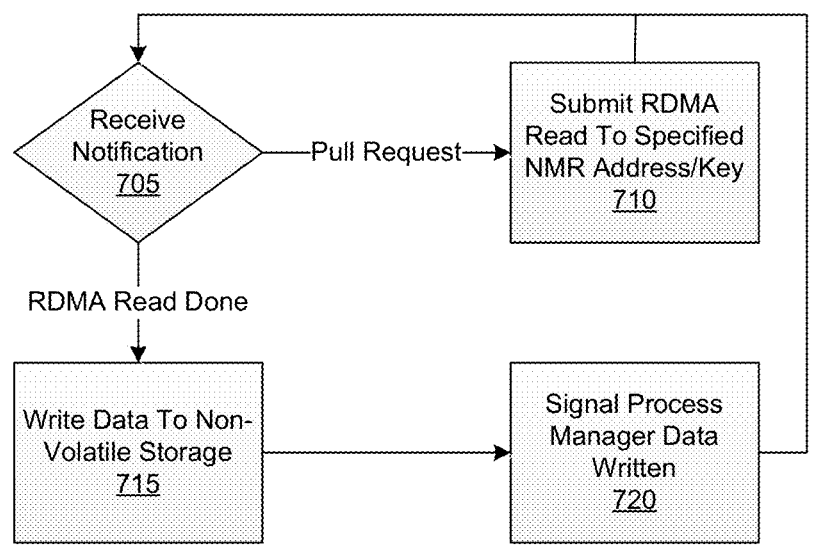

More detailed embodiments are now addressed. FIG. 3 includes a block diagram of volatile memory of a compute node in an embodiment of the invention. FIGS. 4-5 includes flow diagrams for a first phase of checkpoint processing in embodiments of the invention. FIGS. 6-7 include flow diagrams for a second phase of checkpoint processing in an embodiment of the invention.

As mentioned above, multiple applications may run on each compute node 110, 111, 112, 113, and 114. FIG. 3 includes an embodiment for volatile memory, such as memory 215 of FIG. 2. Memory 315 is divided into workspaces 316, 336, 346, one workspace per application. Each workspace is divided into one or more sections of calculated process data (e.g., produced as a result of processing a distributed application), along with general state information regarding the progress of the calculation (e.g., contents of processor registers). For example, workspace 316 includes section 317 for state data related to a first application. Workspace 316 further includes sections 318 and 319 respectively for process data 321, 322, both of which are related to the first application. In similar fashion, a second application relates to state information 337 and section 338 for data 341. A third application relates to state information 347 and sections 348, 349 respectively for data 351, 352.

A conventional checkpoint operation can be described with the following sequence: (1) initiate a checkpoint so the application halts computations; (2) a compute node transfers workspace state information over a network to an IO node; (3) the IO node writes the workspace state data to non-volatile memory (e.g., hard drive); (4) the compute node transfers workspace processed data sections to the IO node; (5) the IO node writes each section to non-volatile memory; and then (6) the compute node continues with computation. This can be viewed as a push model, where the compute node (and its processor) pushes/writes the data to the IO node and the processor is burdened with the data transfer all the way to the IO node.

In contrast, embodiments in FIGS. 4-7 concern a pull model where state information and computed data are read (i.e., pulled) by an IO node. Thus, an embodiment pulls the data over the network to alleviate network congestion at the IO node. Using an RDMA NIC, an IO node reads data from a compute node. To reduce checkpoint time as experienced by the application, data in the process' workspace is copied to an NMR on the compute node. The copying of the data is a joint effort between the compute node CPU and RDMA NIC. For example, an embodiment uses the following sequence: (1) initiate a checkpoint, (2) an application halts computations, (3) the compute node processor copies the workspace to local NMR, (4) the compute node continues with computation, (5) the IO node reads the workspace into the IO network buffer, and then (6) the IO node writes the IO network buffer to non-volatile memory (e.g., hard drive).

Specifically addressing FIG. 4, in block 405 processor 201 determines whether a checkpoint exists. For example, processor 201 of compute node 210 determines whether process manager 105 has initiated a checkpoint. If not, in block 410 processor 201 processes the application. However, if a checkpoint has been initiated then in blocks 415, 420 each process is halted and, in one embodiment, state information is stored in volatile memory 215 (along with process data that is also stored in memory 215). In block 425 state information is then stored to NMR 225. However, in other embodiments the state information is stored directly to NMR 225 instead of being first located in memory 215.

In block 430 the "pending RDMA request" is set to 0. Then, in block 435 the workspace (e.g., including state information 317 (if not already located in NMR) and data 321, 322) is saved to NMR 225. FIG. 5 illustrates a more detailed embodiment of block 435. In block 440, if there are no pending RDMA requests then the processor continues computing in block 410. However, if there are such requests then the RDMA requests are processed in block 445. This may be done simultaneously with the processor processing the application due to usage of RDMA and storage of state information and data in NMR 225. Embodiments for block 445 are discussed in greater detail in FIGS. 6 and 7.

In FIG. 5 block 535 corresponds to block 435 of FIG. 4. Process 500 includes alternative paths for saving workspaces 316, 336, 346 to NMR. In block 540, the system determines whether all sections have been processed. If yes, then no copying is needed (block 545). However, if sections still need to be processed then the process advances to block 550. In block 550 it is determined whether the pending number of RDMA requests satisfies a threshold. Such a threshold may be based on a capacity limitation for the device (e.g., for the RDMA NIC). For example, if the pending number of requests is less than the threshold then RDMA is an option. Thus, in block 555 the number of pending RDMA requests is incremented. In block 560 the RDMA write is submitted (e.g., submitted into a queue) in order to copy the pertinent section (e.g., workspace 316) to NMR 225 via, for example, RDMA NIC 220 included in compute node 210.

However, if in block 550 the RDMA requests exceed a threshold then in block 575 the section (e.g., workspace 316) may be copied to NMR 225 via a processor (e.g., processor 201). After copying the section in volatile memory is marked as available (block 580) and processor 201 may resume processing the application and storing other data into the volatile memory just released. In block 585 a pull request may be submitted to remote nodes (e.g., IO node 120) along with the section's NMR address and any needed cryptographic keys, hashes, and the like. In block 565 if the RDMA request is complete then the RDMA request may be processed in block 570 (discussed in greater detail below in passage related to FIG. 6).

Thus, as seen in FIG. 5 the copying or transferring of process data (and possibly state information in some embodiments) from a workspace in volatile memory 215 to NMR 225 is a joint effort between the compute node processor (e.g., CPU 201) and a RDMA utility (e.g., RDMA NIC 220). The host CPU may perform steps 575, 580, and 585 and the RDMA NIC may perform steps 555 and 560. The decision "pending RDMA requests<threshold" of block 550 is used to determine if RDMA NIC 220 copies a section to NMR 225 using RDMA writes (the "yes" path) or if host CPU 201 copies the section to NMR 225 (the "no" path). As an example, RDMA NIC 220 may copy section 1-1 (element 318) to a first portion of NMR 225, while CPU 201 copies section 1-2 (element 319) to a second portion of NMR 225. The second portion does not overlap the first portion of NMR 225. In other words, the first and second portions may share the same memory but are separate from another to allow simultaneous access to the first and second portions. The copies may be made in parallel (i.e., simultaneously) with both CPU 201 and NIC 220 handling different portions of the transfer. This contrasts with conventional methods that utilize a more straightforward approach where the CPU handles all of the copying. In an embodiment, once a section of RAM 215 has been copied to NMR 225, RAM 215 may be modified. For example, computation may proceed on the compute node as soon as it may begin modifying RAM 215.

FIG. 6 includes an embodiment showing greater detail of block 570 of FIG. 5. In FIG. 6, block 670 includes processing the RDMA completion. The RDMA completion may be a signal indicating the transfer or copying of information from the compute node's local volatile memory (e.g., 215) to local non-volatile memory (e.g., 225) is complete. Furthermore, after the data has been copied to NMR 225, compute node 210 may signal the control node that it is done. The control node may then signal the IO nodes when compute node 210 has completed copying its data to NMR 225.

In block 680 the pending number of RDMA requests may be decremented (which will affect block 550 of FIG. 5). In block 685 the volatile memory (from which the state information and/or process data was copied) 215 may be marked as available. In other words, those portions of memory 215 are "released" so a process on the compute node may process an application and store state and/or process data into the released memory. In block 690 a "pull" request may be submitted to IO nodes (or other remote node). The request may provide the address for the non-volatile memory portions (225) that include the state information and/or process data to be pulled over to the IO node. Any requisite cryptographic tools (e.g., keys, hashes) needed to access NMR 225 portions may also be included in the request of block 690. The process may continue towards the actual pull operation in block 695.

FIG. 7 concerns the pull operation as seen from the perspective of IO node 120, 121, 122. In block 705 the IO node (e.g., 120) receives a notification. The notification or signal may be the pull request that was the subject of block 690 in FIG. 6. If so, in block 710 IO node 120 submits an RDMA read to the specified NMR 225 address along with needed cryptographic information (e.g., keys or information encrypted in a way that is compliant with a key on the compute node, etc.). The process then returns to block 705.

However, if the signal or notification of block 705 includes notification that the RDMA read (i.e., pull) is complete, IO node 120 may now write (i.e., push) the received information to other non-volatile storage such as array 130. In block 720 IO node 120 may signal to process manager 105 that the push (to storage array) and pull (from NMR) operations are complete. The process then returns to block 705. In the pull operation the data is accessed by RDMA NIC 220 directly without involving the host CPUs (201, 202, 203, 204) of the compute node 210 or nodes.

In various embodiments, RDMA hardware (e.g., RDMA NIC 220) may be located locally on compute node 210 or just accessible via RDMA network 115. Locating the hardware locally on each compute node allows both the compute node CPUs (201, 202, 203, 204) and RDMA NICs 220 to copy the data from RAM 215 to NMR 225, from where the IO nodes 120, 121, 122 can fetch the data.

Thus, various embodiments provide one or more features that, for example, help reduce checkpoint latency. For example, one embodiment calls for the combined use of a CPU 201 and RDMA NIC 220 to transfer workspace data to local NMR 225. The "combined use" is exemplified in the "yes" and "no" branches for block 550 of FIG. 5. The combined use format helps offload transfer burdens from the compute node processor so the processor can more quickly return to processing the application.

An embodiment also helps reduce latency based on the use of the compute node's local NMR 225 and DMA assisted hardware (e.g., RDMA NIC 220) which help reduce the time required to complete the checkpoint from an application's (running on the compute node) perspective (e.g., by removing the traditional need to transfer the information from volatile memory 215 across a network link 115 to a remote IO 120, 121, 122).

Further, an embodiment using segmentation of workspace data into sections helps reduce latency. As seen in FIG. 3, process data sections 321 and 322 are divided away from each other. Also state information 317 is divided away from sections 321, 322. As a result, as soon as a section has been saved to NMR 225, the compute process may continue calculations on data within that section. RDMA hardware can continue to copy sections (in the background) while CPU 201 is re-dedicated to performing calculations.

Also, in certain embodiments the use of RDMA hardware by IO nodes 120, 121, 122 to pull saved sections from the compute node NMR 225 helps reduce latency. An IO node 120, 121, 122 may pull a section as soon it has been copied to the NMR 225, providing overlapping operation with new sections being saved to volatile memory 215 and even to other sections of NMR 225. This reduces the minimum time required between checkpoints. Where IO nodes 120, 121, 122 fetch the data across the network 115, the use of RDMA allows this to occur without using the processing capabilities on compute nodes 210. The RDMA devices may also be used when copying the data between RAM 215 and NMR 225. This allows the system to overlap processing with the copying of data between RAM 215 and NMR 225 (once some portion of RAM may be modified), and also allows overlapping processing with the data being transferred over the network 115 to the IO nodes 120, 121, 122.

Specifically, conventional methods focus on increasing the speed of a performing any of the traditional steps. That is, when a checkpoint is requested, all nodes cease computation, write their data over the network to permanent storage, and then resume computation. After all data has been collected at the IO node, the checkpoint is done from the viewpoint of the compute nodes. The IO nodes then copy the data stored in the NMR to cheaper disks. This is a "push" model with the checkpoint time limited by the speed of the network writing to the IO nodes. While the checkpoint network operations are in progress, computation is blocked. In contrast, various embodiments of the invention reduce latency by facilitating overlapping operations through the use of hardware assist (i.e., the ability to process an application on the compute node while an IO node pulls information from the compute node).

Figure 8:
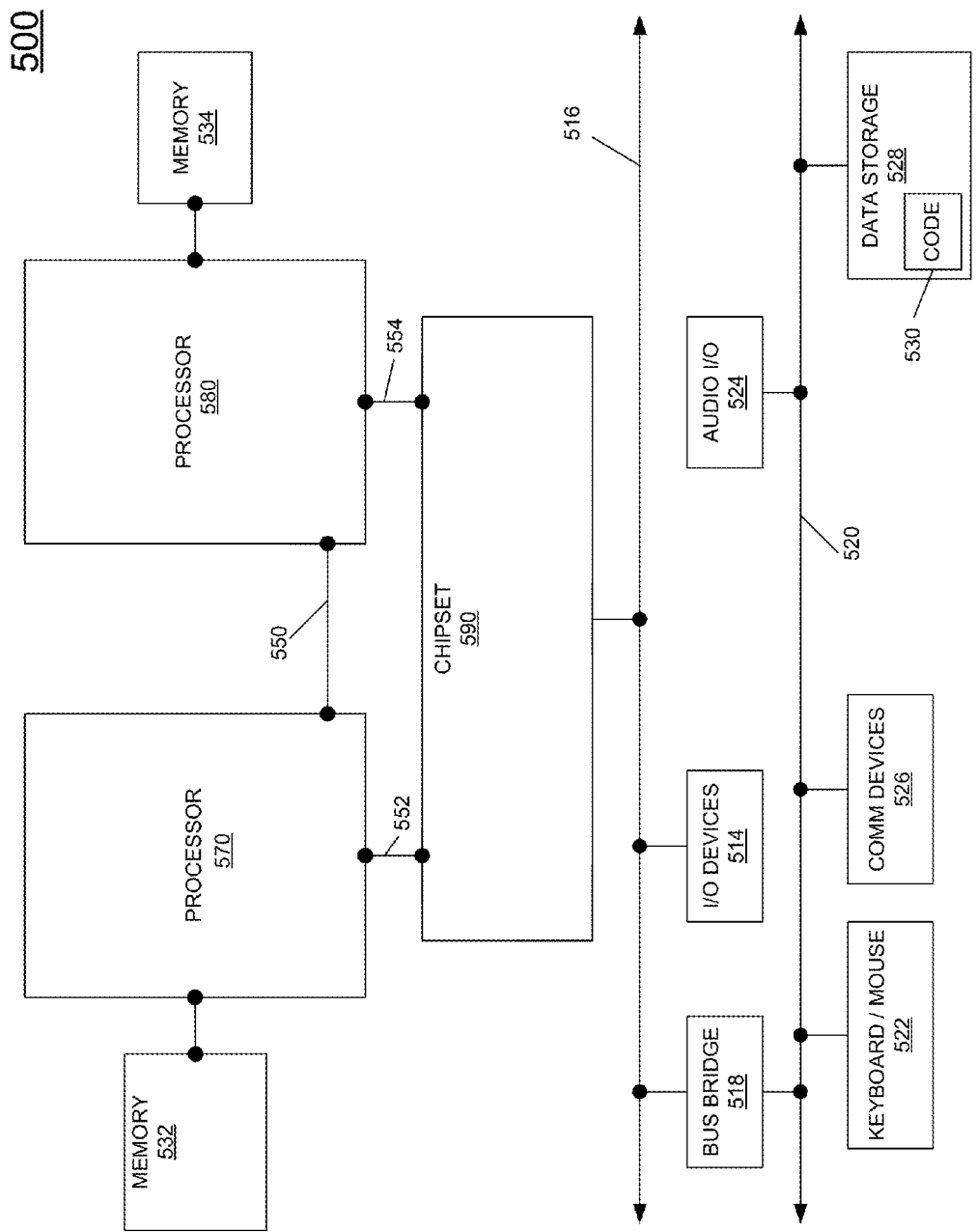
FIG. 8 depicts a system for use with embodiments.

Embodiments, such as compute nodes 210 and/or IO nodes 120, 121, 122 may be implemented in many different system types. Referring now to FIG. 8, shown is a block diagram of a system in accordance with an embodiment of the present invention. Multiprocessor system 500 is a point-to-point interconnect system, and includes a first processor 570 and a second processor 580 coupled via a point-to-point interconnect 550. Each of processors 570 and 580 may be multicore processors. First processor 570 may include a memory controller hub (MCH) and point-to-point (P-P) interfaces. Similarly, second processor 580 may include a MCH and P-P interfaces. The MCHs may couple the processors to respective memories, namely memory 532 and memory 534, which may be portions of main memory (e.g., a dynamic random access memory (DRAM)) locally attached to the respective processors. First processor 570 and second processor 580 may be coupled to a chipset 590 via P-P interconnects, respectively. Chipset 590 may include P-P interfaces. Furthermore, chipset 590 may be coupled to a first bus 516 via an interface. Various input/output (I/O) devices 514 may be coupled to first bus 516, along with a bus bridge 518, which couples first bus 516 to a second bus 520. Various devices may be coupled to second bus 520 including, for example, a keyboard/mouse 522, communication devices 526, and data storage unit 528 such as a disk drive or other mass storage device, which may include code 530, in one embodiment. Code may be included in one or more memories including memory 528, 532, 534, memory coupled to system 500 via a network, and the like. Further, an audio I/O 524 may be coupled to second bus 520.

The term "processor" may refer to any device or portion of a device that processes electronic data from registers and/or memory to transform that electronic data into other electronic data that may be stored in registers and/or memory. A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

Embodiments may be implemented in code and may be stored on a non-transitory storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" cover a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered. Components or modules may be combined or separated as desired, and may be positioned in one or more portions of a device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   processing a first application on a compute node, which is included in a cluster, to produce first computed data and then storing the first computed data in a first section of volatile memory included locally in the compute node;
   halting the processing of the first application based on an initiated checkpoint;
   storing first state data corresponding to the halted first application and the first computed data in non-volatile memory included locally in the compute node;
   resuming processing of the halted first application and then continuing the processing the first application to produce second computed data while simultaneously pulling the first state information and the first computed data from the non-volatile memory to an input/output (IO) node; and
   storing the second computed data in a second section of the volatile memory simultaneously with storing the first computed data in the non-volatile memory.

2. The method of claim 1 comprising storing one of the first state information and the first computed data in the non-volatile memory using a direct memory access (DMA) of the volatile memory.

3. The method of claim 2 comprising:
storing the second computed data in the non-volatile memory using at least one processor included in the compute node and without using a DMA of the volatile memory.

4. The method of claim 3 comprising:
determining a pending number of access requests to the volatile memory satisfies a threshold; and
storing the second computed data in the non-volatile memory using the processor based on determining the pending number of access requests satisfies the threshold.

5. The method of claim 1 comprising:
processing the first application on the compute node to produce third computed data and then storing the third computed data in a third section of the volatile memory, the third section not overlapping the first section;
storing the first computed data in the non-volatile memory using a direct memory access (DMA) of the volatile memory while simultaneously storing the third computed data in the non-volatile memory using at least one processor included in the compute node and without a DMA of the volatile memory.

6. The method of claim 1 comprising pulling the first state information and the first computed data from the non-volatile memory to the IO node using a remote direct memory access (RDMA).

7. The method of claim 1 comprising reserving both of the first and second sections of the volatile memory for the first application.

8. The method of claim 1, wherein pulling the first state information and the first computed data from the non-volatile memory to the IO node includes the IO node reading the first state information and the first computed data.

9. The method of claim 1 comprising pushing, via a write operation, the first state information and the first computed data from the IO node to a non-volatile storage array simultaneously with processing the first application.

10. The method of claim 1 comprising, while processing of the first application is halted, storing the first state information and the first computed data in the non-volatile memory.

11. A system comprising:
a compute node included in a cluster;
volatile memory and non-volatile memory included locally in the compute node; and
at least one machine accessible medium having instructions stored thereon, the instructions when executed on the system cause the system to:
process a first application to produce first computed data and then store the first computed data in a first section of the volatile memory;
halt the processing of the first application based on an initiated checkpoint;
process the first application on the compute node to produce third computed data and then store the third computed data in a third section of the volatile memory, the third section not overlapping the first section;
store first state data corresponding to the halted first application in the non-volatile memory;
store the first computed data in the non-volatile memory using a direct memory access (DMA) of the volatile memory while simultaneously storing the third computed data in the non-volatile memory using at least one processor included in the compute node and without a DMA of the volatile memory; and
resume processing of the halted first application and then continue processing the first application to simultaneously produce second computed data and pull the first state information and the first computed data from the non-volatile memory to an input/output (IO) node.

12. The system of claim 11 further comprising instructions that when executed on the system cause the system to store the first state information in the non-volatile memory using a DMA of the volatile memory.

13. The system of claim 12 further comprising instructions that when executed on the system cause the system to:
store the second computed data in the volatile memory; and
store the second computed data in the non-volatile memory using the at least one processor included in the compute node and without using a DMA of the volatile memory.

14. The system of claim 13 further comprising instructions that when executed on the system cause the system to:
determine a pending number of access requests to the volatile memory satisfies a threshold; and
store the second computed data in the non-volatile memory using the at least one processor based on determining the pending number of access requests satisfies the threshold.

15. The system of claim 11 further comprising instructions that when executed on the system cause the system to pull the first state information and the first computed data from the non-volatile memory to the IO node using a remote direct memory access (RDMA).

16. The system of claim 11 further comprising instructions that when executed on the system cause the system to store the second computed data in a second section of the volatile memory.

17. The system of claim 16 further comprising instructions that when executed on the system cause the system to simultaneously store the second computed data in the second section of the volatile memory and store the first computed data in the non-volatile memory.

18. The system of claim 11, wherein pulling the first state information and the first computed data from the non-volatile memory to the IO node includes the IO node reading the first state information and the first computed data.

19. At least non-transitory one machine-accessible medium having instructions stored thereon, the instructions when executed on a processor-based system cause the system to:
process a first application on a compute node, which is included in a cluster, to produce first computed data and then store the first computed data in a first section of volatile memory included locally in the compute node;
halt the processing of the first application based on an initiated checkpoint,
store first state data corresponding to the halted first application and the first computed data in non-volatile memory included locally in the compute node;
resume processing of the halted first application and then continue processing the first application to produce second computed data while simultaneously pulling the first state information and the first computed data from the non-volatile memory to an input/output (IO) node; and simultaneously store the second computed data in a second section of the volatile memory and the first computed data in the non-volatile memory.

20. The at least one medium of claim 19 including instructions that enable the system to store one of the first state information and the first computed data in the non-volatile memory using a direct memory access (DMA) of the volatile memory.

21. The at least one medium of claim 20 including instructions that enable the system to:
store the second computed data in the non-volatile memory using at least one processor included in the compute node and without using a DMA of the volatile memory.

22. The at least one medium of claim 20 including instructions that enable the system to pull the first state information and the first computed data from the non-volatile memory to the IO node using a remote direct memory access (RDMA).

\* \* \* \* \*